Nov. 25, 1941.  W. B. PAYNE  2,263,818
CHECK WRITING, ADDING, AND LISTING MACHINE
Filed Aug. 24, 1937  8 Sheets-Sheet 3

Fig. 4

INVENTOR
Walter B. Payne
BY Cumpston & Shepard
his ATTORNEYS

Nov. 25, 1941. W. B. PAYNE 2,263,818
CHECK WRITING, ADDING, AND LISTING MACHINE
Filed Aug. 24, 1937 8 Sheets-Sheet 4

INVENTOR
Walter B. Payne
BY Cumpston & Shepard
his ATTORNEYS

Nov. 25, 1941.  W. B. PAYNE  2,263,818
CHECK WRITING, ADDING, AND LISTING MACHINE
Filed Aug. 24, 1937  8 Sheets-Sheet 6

INVENTOR
Walter B. Payne
BY Cumpston & Shepard
his ATTORNEYs

Nov. 25, 1941.  W. B. PAYNE  2,263,818

CHECK WRITING, ADDING, AND LISTING MACHINE

Filed Aug. 24, 1937  8 Sheets-Sheet 8

INVENTOR
Walter B. Payne
BY Cumpston & Shepard
His ATTORNEYS

Patented Nov. 25, 1941

2,263,818

UNITED STATES PATENT OFFICE 2,263,818

CHECK WRITING, ADDING, AND LISTING MACHINE

Walter B. Payne, Rochester, N. Y., assignor to The Todd Company, Inc., Rochester, N. Y., a corporation of New York Application August 24, 1937, Serial No. 160,647

5 Claims. (Cl. 235—60)

The present invention deals with a machine for writing numbers or amounts or the like upon checks or other documents or papers, and for adding or totaling a series of numbers or amounts thus written, and for listing the individual numbers or amounts upon a record strip or sheet which may be kept permanently, if desired.

An object of the invention is the provision of such a machine which is of a generally improved and more satisfactory nature in comparison to such machines heretofore known, and which is relatively easy and inexpensive to manufacture and to keep in service.

Another object is the provision of such a machine so arranged that it may print upon either single checks or sheets containing a number of checks, and may receive and operate satisfactorily upon checks or sheets of checks of widely different dimensions.

Still another object is the provision of a machine of this character which is made up largely of parts of an existing commercial check writing machine and parts of an existing commercial adding and listing machine, requiring only comparatively few parts of special design for operatively interconnecting the existing check writing machine parts with the existing adding and listing machine parts.

A further object is the provision of such a machine embodying simple and effective power driving means.

A still further object is the provision of such a machine having suitable interlocking mechanism to prevent improper actuation of the machine, and having various features of adjustment so that the machine may be easily adjusted and kept in proper adjustment.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figure 1:
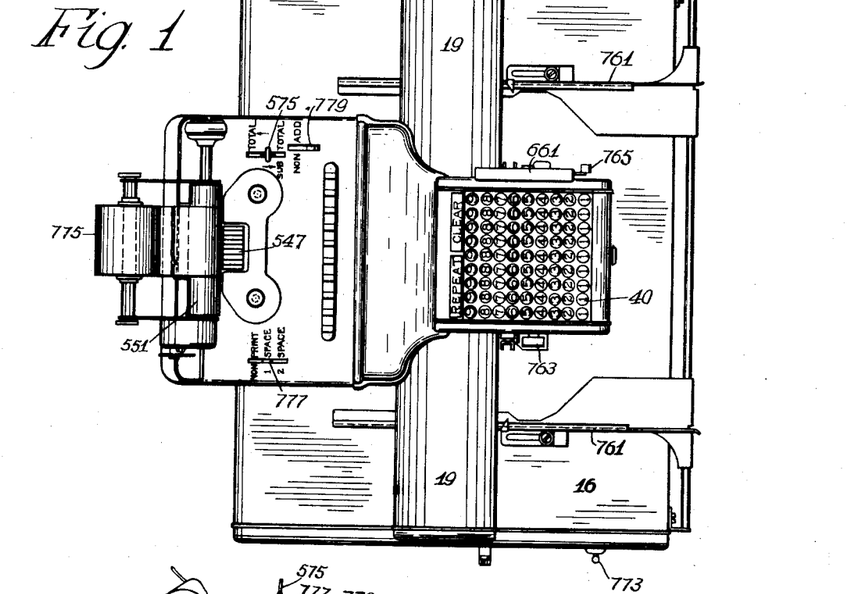
Fig. 1 is a plan of a machine constructed in accordance with a preferred embodiment of the invention.
Figure 2:
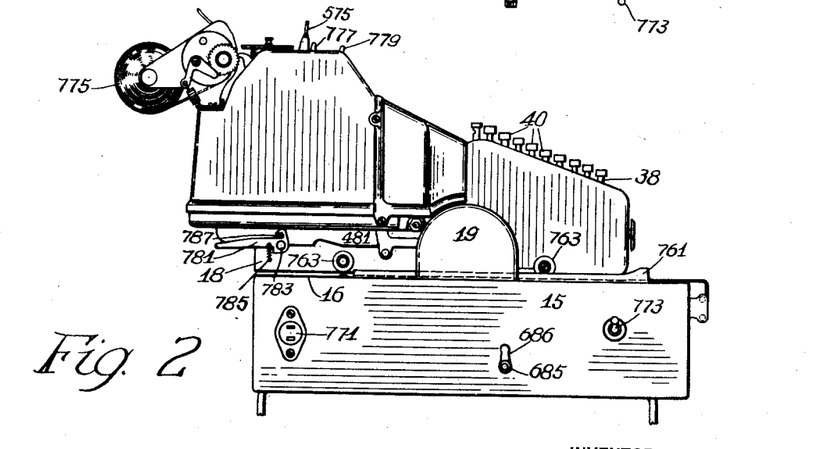
Fig. 2 is an end elevation thereof, viewed from the left hand end.
Figure 4:
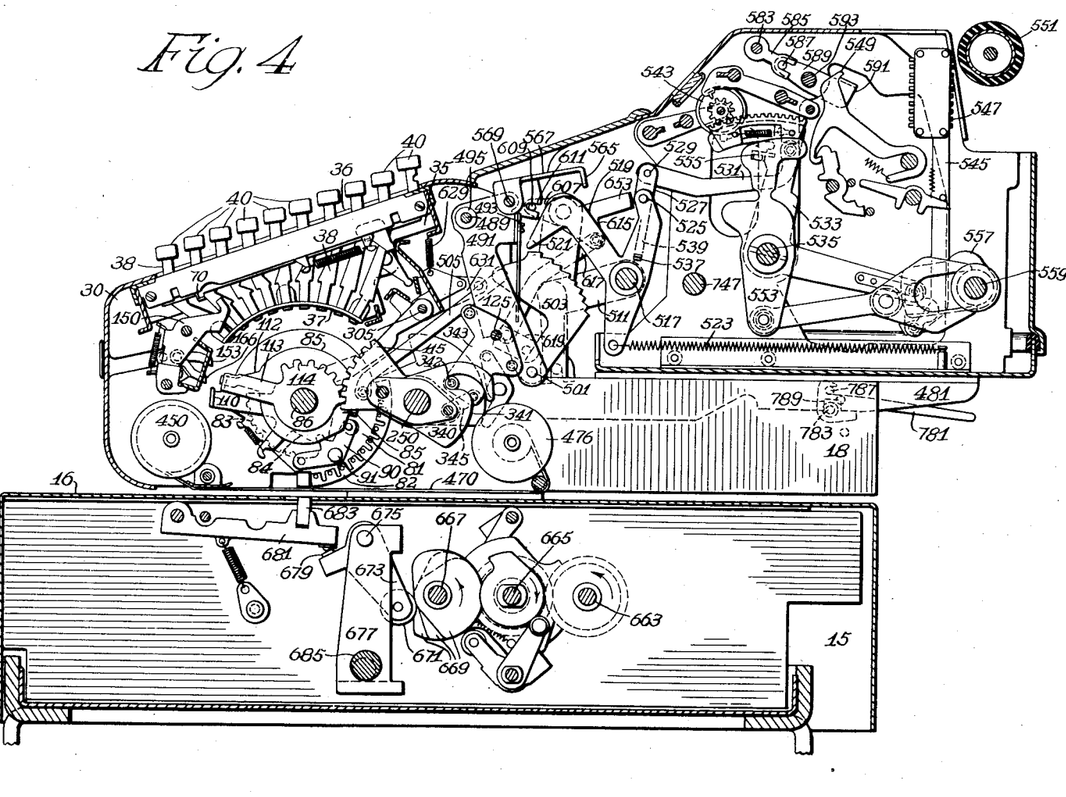
Fig. 4 is a vertical section through the machine viewed from the right, the section being taken substantially on the line 4—4 of Fig. 3, and the parts being shown in normal position of rest.
Figure 7:
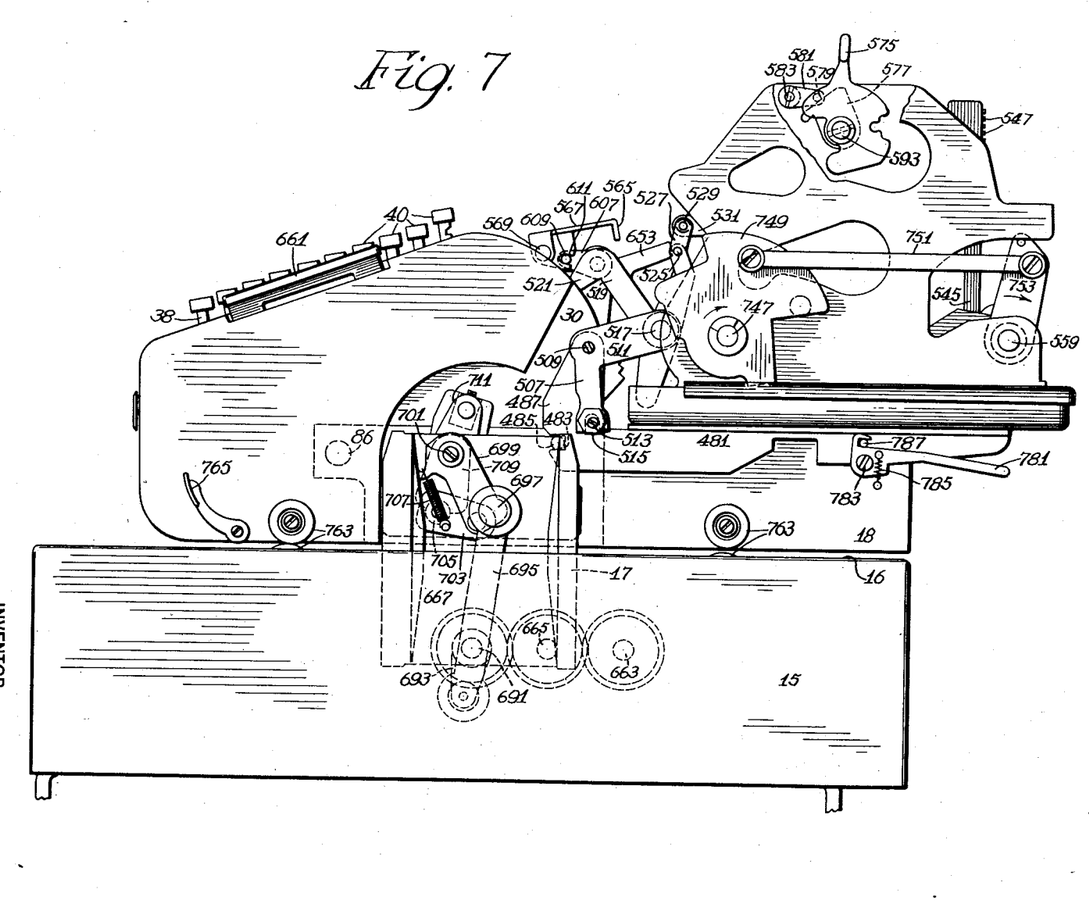
Fig. 7 is an elevational view of the machine viewed from the right end, with various casing parts removed to show some of the driving connections and other parts.
Figure 8:
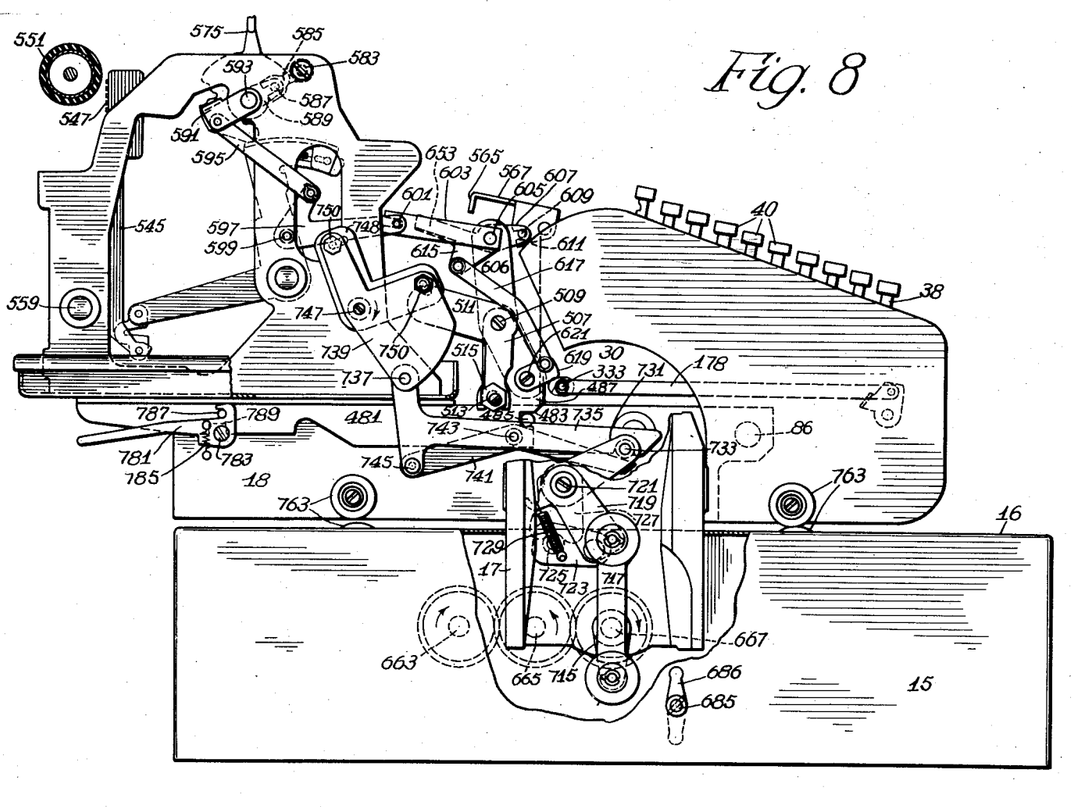
Fig. 8 is an elevation of the machine viewed from the left end, likewise with various casing parts removed to show certain of the driving connections and other parts.

Referring first to Figs. 1 and 2, the machine herein illustrated as a preferred embodiment of the invention comprises a lower casing 15 having a substantially flat table-like top 16. Long U-shaped brackets 17 have approximately parallel legs extending approximately horizontally, the lower leg of each bracket being suitably fixed within the casing 15, at or below the top surface 16 thereof, and the upper leg of each bracket being above this top surface 16, the connection between the upper and lower legs being approximately at the extreme side edges of the top surface 16 so that the brackets do not interfere with movement in a direction from front to back of the casing top 16, of a check or sheet of checks having a width almost equal to that of the top 16. Such a bracket construction is more fully disclosed in W. B. Payne Patent 2,122,536, granted July 5, 1938, to which reference is made for such details of the bracket construction and operating mechanism as are not fully illustrated herein. The upper legs of the brackets 17, extending inwardly toward the center line of the table 16 from the extreme side edges thereof, carry at their inner ends a rigid frame 18 (Figs. 4, and 7 to 10), and preferably form the sole support of this frame, the bottom edge thereof being spaced from the top surface 16 of the lower casing 15, as shown in Figs. 4, 7, and 8, to provide a check or sheet receiving slot between them. Casing sections 19 may enclose the upper legs of the brackets 17.

Figure 3:
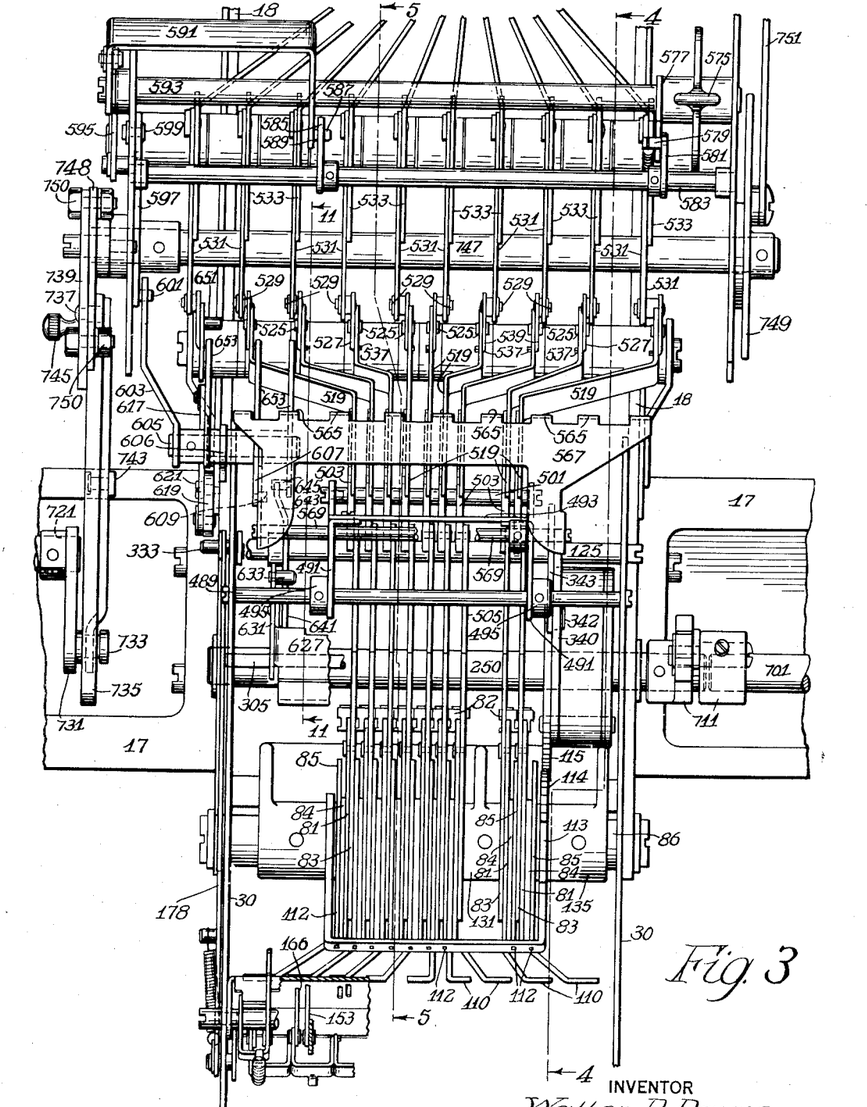
Fig. 3 is a plan of part of the mechanism, with the casing, the key board, and various other elements removed.

On this frame 18 are mounted the side plates 30 (Fig. 3) of the check writer unit, the plates 30 being placed alongside the frame members 18, as shown in Fig. 3, in overlapping relation thereto and being suitably secured thereto. This check writer unit, except in the respects hereafter pointed out, may be constructed substantially the same as the check writer disclosed in the copending United States patent application of Walter B. Payne, Serial No. 704,328, filed December 28, 1933, for Check writing machine, and issued September 14, 1937, as Patent 2,092,852. Reference is made to said patent issued on said copending application for a more complete explanation of the parts of the check writer unit of the present machine, which parts need not be described in great detail here, in view of the disclosure thereof in said patent issued on said copending application.

The present check writing unit, just as in the case of the machine disclosed in said patent, has a keyboard made up of a plurality of denominational units, each including a vertical plate 35 having its upper edge bent over laterally at 36 and having an arcuate flange or segment 37 at its lower edge. Nine depressible key stems 38, one for each numerical digit from 1 to 9, inclusive, are mounted on each denominational unit of the keyboard, slidable upwardly and downwardly through slots in the portions 36 and 37, each stem being provided with a head 40.

Figures 11, 12, 13:
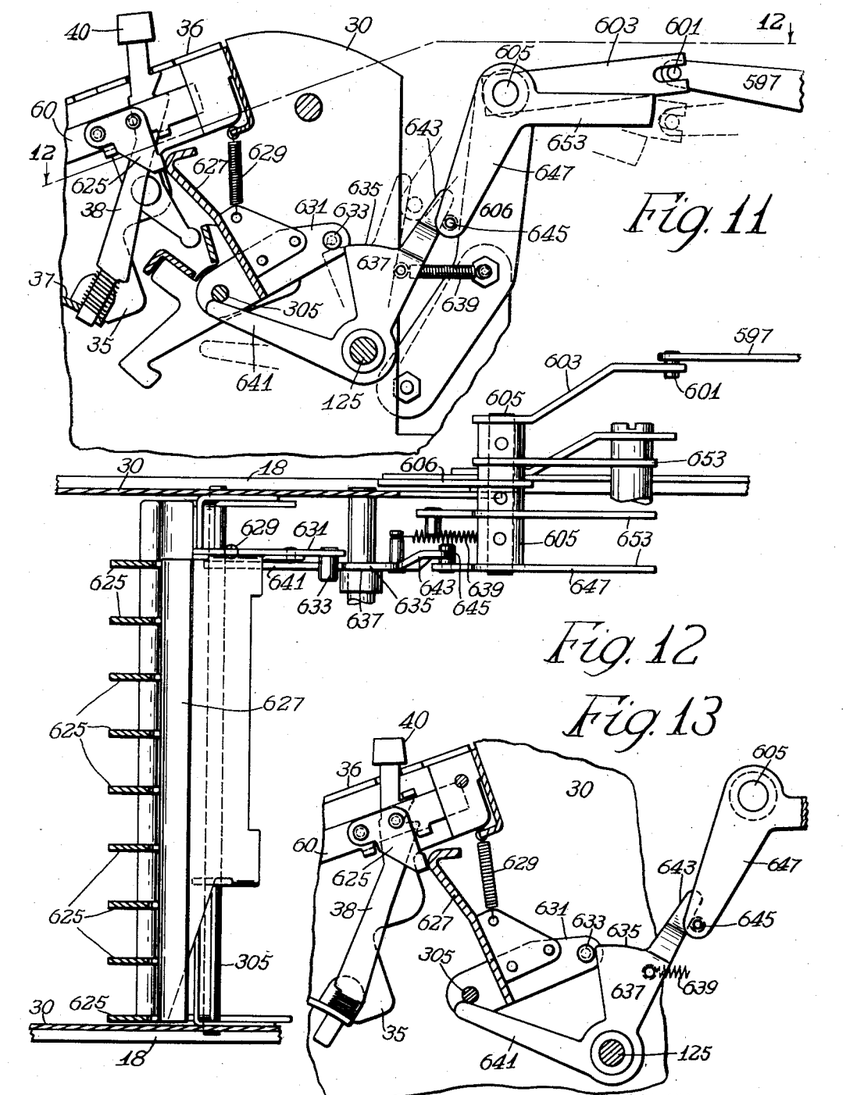
Fig. 11 is a fragmentary vertical section taken substantially on the line 11—11 of Fig. 3, with parts in elevation, and illustrating the interlocking mechanism for preventing actuation of any of the amount keys when the machine is set to take a total or sub-total and for preventing the taking of a total or sub-total when any of the amount keys are set.
Fig. 12 is a horizontal section taken substantially on the line 12—12 of Fig. 11.
Fig. 13 is a view similar to a fragment of Fig. 11, illustrating the position of the parts when one of the amount keys of the keyboard has been depressed.

Lying alongside of and just to the right of each denominational row of key stems 38 is a control bar 60, normally having the position illustrated in Fig. 11 when no key of its denomination or row is depressed, this bar being shifted rearwardly to the position shown in Fig. 13, in the manner disclosed in said Patent 2,092,852, when any key in its denominational row of keys is depressed.

A zero stop and blank stop control ear 70 (Figs. 4 and 5) is carried by the control bar 60 of each denomination, to cooperate with a feeler lever 150 which controls the operation of the zero stop 153 and blank stop 166 of that denomination in the manner fully disclosed in said Patent 2,092,852.

Extending across the machine from one of the side plates 30 to the other thereof, is a shaft 86 (Figs. 3 to 6) on which are mounted a series of assemblages, one for each denomination. Each assemblage includes a type disk 81 carrying a type segment 82 having a series of type faces thereon representing the digits from 1 to 9, inclusive, and a zero next to the 1. Each assemblage also includes a locking member 83 on one side of the type disk, a controller 84 on the opposite side of the type disk from the locking member, and a driving member 85 on the opposite side of the controller 84 from the type disk, together with a latch 90 pivoted to the type disk at 91 and arranged, when the driver is rotated in a clockwise direction (when viewed as in Fig. 4) to drive or rotate the type disk 81 correspondingly in a clockwise direction until the end 110 of an arm on the controller 84 hits either the blank stop 166, the zero stop 153, or the depressed end of one of the key stems 38, whereupon the latch is disconnected to stop the driving of the type disk 81 even though the driving member 85 may continue to rotate somewhat further, and the latch then latches the type disk in stationary position to the locking member 83. This is all described in greater detail in said patent issued on said copending application.

Those printing or type assemblages on the shaft 86 which correspond to the units of cents and tens of cents denominations may be somewhat separated from those corresponding to the various dollar denominations, and in the space between these two groups of assemblages there may be mounted stationarily on a stationary arm 131 (Fig. 3) on the shaft 86 a printing type bearing the word "and" or the ampersand sign "&" or other suitable wording. Also, to the right of the units of cents denominational assemblage the shaft 86 may carry another arm 135 (Fig. 3) on which is stationarily mounted another type character printing any desired matter, such as the word "cents" or the sign "¢." To the left of the type assemblage corresponding to the highest dollar denomination, the shaft 86 may carry an arm in which is a longitudinal guideway and a slidable prefix character of any suitable known construction, operated, for example, in the manner disclosed in said patent issued on said copending application.

Rotatably mounted on the shaft 86 is a bail 113 (Fig. 4) which extends across all of the printing units and which receives the outer ends of arms 112 on the driving members 85, so that as the bail 113 rotates around the shaft 86, it carries all of the driving members 85 with it. At its right end the bail has gear teeth 114 meshing with gear teeth on a segment 115 rotatably mounted on the main operating shaft 250 of this part of the machine.

For operating the segment 115 and other parts of the machine, a cam 340 (Fig. 4) may be fixed to the shaft 250 near the right side of the machine. This cam has a surface 341 for engaging a cam follower roller 342 on a lever 343 rotatably mounted on a cross shaft 125. A link 345 connects the lever 343 to the rear end of the gear segment 115. Hence, when the main operating shaft 250 is turned in a counterclockwise direction when viewed as in Fig. 4, the cam 340 will move the lever 343 which, through the link 345, will shift the segment 115 to swing the bail 113 and carry all the driving members 85 around with it in a clockwise direction when viewed as in Fig. 4, thus positioning each of the type elements or printing elements 82 in the position determined by the respective settable keys 40, or in the position determined by the zero stop 153 or the blank stop 166, in denominations in which no key 40 has been depressed.

Suitable inking mechanism may be provided for making an inked impression upon paper or the like, by those printing types which have been set to the desired printing line. For example, there may be a front ribbon spool 450 from which is led a supply of inked ribbon 470, passing rearwardly beneath the type elements 82, the ribbon being rewound on a winding spool 476 turned by any suitable mechanism.

The foregoing described parts of the check writing unit are substantially the same as the corresponding parts of the check writing machine disclosed in said Patent 2,092,852, issued on said copending application, Serial No. 704,328, and operate in substantially the same way. For convenience of comparison of these parts of the present machine with the corresponding parts of the machine of said patent, the above mentioned elements of the present machine have in general been given the same reference numerals used for the corresponding elements in said patent.

The new or different parts of the present mechanism, not found in said patent, will now be described. The adding and listing unit includes a base frame 481 (Figs. 7-9) resting on the frame 18 and having at its forward end notches 483 embracing pins 485 on the frame 18. There is an upward extension 487 (Fig. 7) on the frame 481 at each side of the forward end thereof. Extending transversely between the side plates 30 of the check writing unit, a little forwardly of the adding and listing unit, is a cross shaft 489 (Figs. 3, 4, and 10) on which are mounted two plate-like arms 491 connected to each other by a transverse comb plate 493, and having notches near the lower ends of both arms 491, for engaging the cross shaft 125 to prevent the arms 491 from swinging around their mounting shaft 489 as a center. Collars 495 pinned to the shaft 489 hold the arms 491 against movement longitudinally of the shaft. Mounted in and supported by the lower ends of the two arms 491 is a transverse shaft 501, on which a series of stepped plates 503 (Figs. 3-6) are mounted for oscillation, there being one such plate for each denomination represented by the keyboard of the check writing unit of the machine. Each plate 503 lies in a notch in the comb plate 493, which thus prevents the plates 503 from shifting longitudinally along the shaft 501. Each stepped plate has a series of steps arranged progressively closer to the shaft 501, the farthest step from this shaft being the blank and zero step, and there being eight other progressively closer steps corresponding to the digits "1" to "8," inclusive. These stepped plates preferably have no step corresponding to the digit "9," for reasons which will appear below. Each of the stepped plates 503 is pivoted to one end of a link 505, the other end of which is pivoted to the type disk 81 of the corresponding denomination.

At opposite sides of the machine are a pair of bell cranks (Figs. 4, 7, and 8) having downwardly extending arms 507 pivoted at their upper ends on the pivot screws 509 screwed into the upward extensions 487 of the frame 481, and having rearwardly extending arms 511. The bottom ends of both arms 507 are forked and embrace eccentric portions on two studs 513, one rotatably mounted on each side of the frame 481, which may be turned by turning polygonal heads 515, to swing the arms 507 in one direction or the other through a limited range of movement about the pivots 509 as a center. The rear ends 511 of the bell cranks carry a cross shaft 517 on which are mounted for oscillation a series of feeler levers 519 (Figs. 4-6) one for each denomination, and each having three arms. One arm, extending forwardly and upwardly from the shaft 517, has a beak or nose 521 for cooperation with the stepped plate 503. A second arm, extending downwardly, is connected to the forward end of a spring 523, the rear end of which is connected to a fixed part of the machine. The third arm, extending upwardly from the shaft 517, is pivoted at 525 to an intermediate point of an arm 527, the upper end of which is pivoted at 529 to a rearwardly extending link 531, the rear end of the link being pivotally connected to a rack lever or actuating lever 533 mounted for oscillation on the cross shaft 535. The arm 527 extends downwardly below the pivot 525 and has its lower end 537 bent sideways to form an ear extending into a slot or hole in the upwardly extending arm of the feeler lever 519. This prevents the arm 527 from swinging relatively to the feeler arm 519 about its pivot 525, but the downwardly extending part 539 of the arm 527 is made relatively thin and easily bendable, so that it may be bent in one direction or the other for purposes of fine adjustment. Bending of the portion 539 of the arm 527 between the pivot 525 and the ear 537, will have the effect of swinging the pivot connection 529 slightly forwardly or rearwardly with respect to any given position of the feeler arm 519, so that an easy and effective adjustment is provided between the beak 521 of the feeler arm and the rack lever 533, this adjustment being individual to each particular denomination. If an adjustment of all of the feeler arms 519 is required as a whole, with respect to the stepped plates 503, then the eccentric studs 513 may be turned to cause the shaft 517 to be moved bodily upwardly or downwardly to the required extent.

The rack levers 533 and the associated parts of the adding and listing unit of the present machine may be constructed in substantially the same manner as the corresponding parts of the commercial "Allen-Wales" adding and listing machine now available on the market, this being approximately the same machine previously known as the "Peters" adding machine, the principal constructional features thereof being disclosed in United States Letters Patent No. 1,386,021, granted August 2, 1921, to Peters, and in United States Letters Patent No. 1,854,875, granted April 19, 1932, to White.

The rack levers 533 of the present machine correspond to the rack levers or diverging levers 74 of said Peters patent, or to the rack levers 41 and diverging levers 40 of said White patent, the two levers 40 and 41 of the White patent being replaced by the single lever 533 of the present machine. The rack teeth on the rack levers 533 operate the totalizer wheels 543 (corresponding to wheels 61 of Peters and wheels 51 of White) in the same manner disclosed in said patents. The rack levers also operate, through connections similar to or identical with those disclosed in said patents, the type bars 545 (Peters 163 and White 54) carrying types 547 (Peters 165) acted upon by hammers 549 (Peters 180 and White 59) to make the usual impressions or recordings upon a strip of paper or other record sheet interposed between the types 547 and a platen 551 (Peters 270). The hammers and other parts are operated in substantially the same way disclosed in said Peters and White patents. The operating mechanism (Figs. 4-6) includes a pair of arms 553 mounted on the shaft 535 on opposite sides of the group of rack levers 533, and a cross bar 555 mounted on these arms 553 and extending across the group of rack levers in front of the upper parts of the levers to hold them normally rearwardly in the position shown in Fig. 4. These levers 553 and cross bar 555 correspond to the levers 151 and cross bar 150 of the Peters patent and to the levers 61 and cross bar 62 of the White patent, and are operated in a manner similar to that disclosed in said patents by means including a cam 557 (White 65) on a shaft 559 (White 24).

Figures 5, 6:
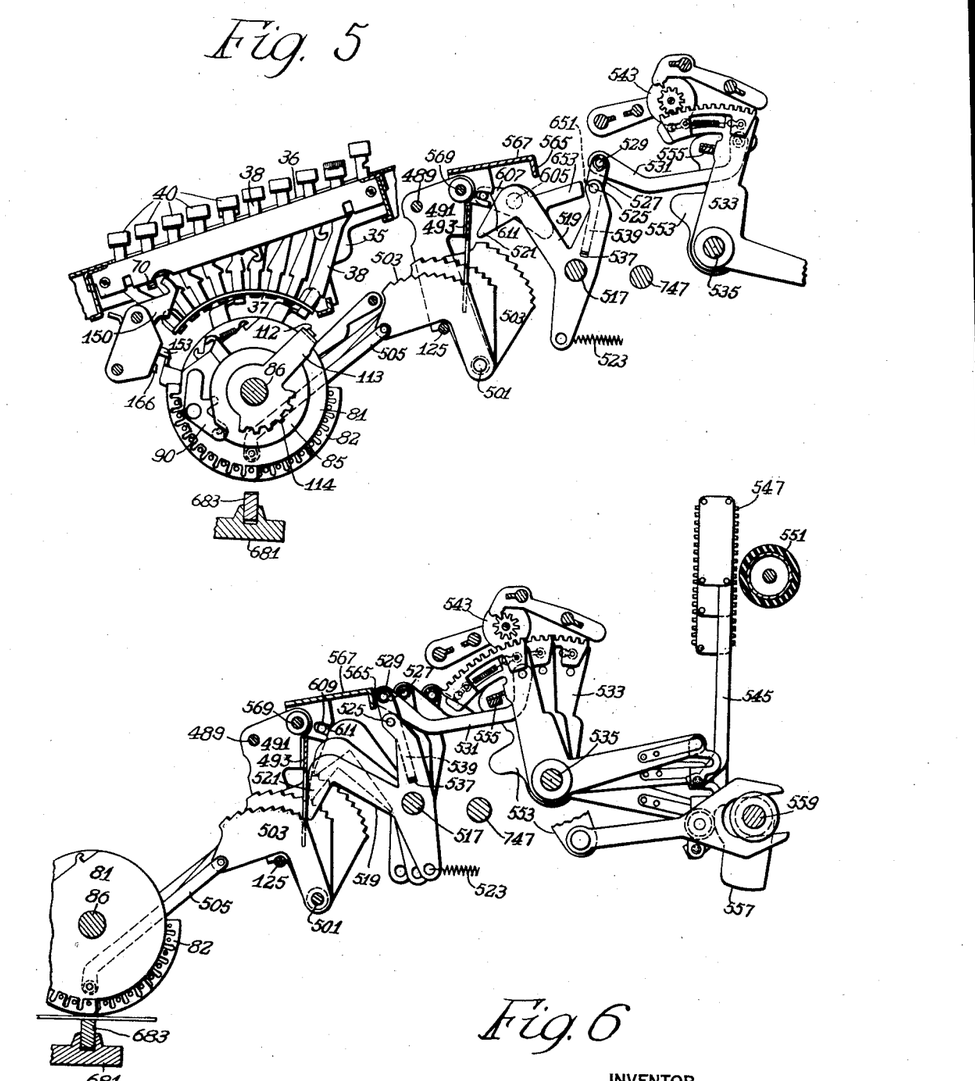
Fig. 5 is a vertical section similar to a portion of Fig. 4, but illustrating the parts at an intermediate point of an operation, with the amount set up on the check writing part of the machine, but with the check not yet printed and the amount not yet run into the adding and listing part of the machine.
Fig. 6 is a similar vertical section illustrating a later stage in the operation than that shown in Fig. 5, with the amount being printed upon the check and with this amount set up in the adding and listing part of the mechanism, ready to print it on the listing strip or sheet and ready to add it into the totalizer.

In the first part of the cycle of operation of the present machine, after the keys 40 of the check writer keyboard are depressed to set the desired number thereon, the type disks 81 are rotated to bring to the printing line of the check writer those printing types of the respective disks which correspond to the keys depressed on the keyboard. This partial rotation of the type disks 81, through the connecting links 505, sets the stepped plates 503 in positions corresponding to those of their respective type disks, so that each plate has, in position to cooperate with its associated beak 521, the proper step corresponding to the position of the associated type disk 81, as shown in Fig. 5. Then the arms 553 swing in a counterclockwise direction (Fig. 4) about the shaft 535, to move the cross bar 555 forwardly, releasing the rack levers 533 so that the respective springs 523 pull all of the rack levers forwardly and beaks 521 downwardly until the beaks contact with and rest upon those steps of the plates 503 which have been set into position to cooperate with the beaks, as shown in Fig. 6.

As previously stated, it is desirable to provide no "9" step on the stepped plates 503, and consequently, whenever one of the type disks 81 is set to position to print the numeral 9, its corresponding stepped plate 503 is moved a little beyond the "8" position, to a position in which no step whatever cooperates with the beak 521. The beak will then continue to move downwardly, beyond the "8" position, until part of the mechanism comes into contact with a "9" stop, preferably one of a series of down-turned flanges or ears 565 (Figs. 4 to 6) on the rear edge of a plate 567 extending across the machine and having ears pivoted on a cross shaft 569 carried by a fixed part of the frame. When this plate 567 is in its normal position indicated in Figs. 4 to 6, the flanges or ears 565 lie at the proper elevation to form stops or abutments to contact with the front ends of the links 531, and to stop the forward motion of the links at the proper position corresponding to the digit "9." Consequently, in any denomination in which the numeral "9" is set up on the type disk 81, the absence of any step or shoulder on the stepped plate 503 in the path of the beak 521 will permit this beak to move downwardly until the front end of the attached link 531 comes into contact with the "9" stop 565, which will position the rack lever 533 in the proper position for running the digit "9" into the totalizer 543, and for printing the numeral "9" by means of the listing types 547.

As explained in said Peters and White patents, the totalizer 543 is out of mesh with the rack teeth on the lever 533 during the forward movement of the lever, but is brought into mesh with the rack teeth during the rearward movement of the lever so that the selected number is run into the totalizer during the rearward or return movement.

At certain times, as, for example, when taking a total or sub-total, it is desirable to move all of the stepped plates 503 out of the way of the beak 521 and to move the 9 stop 565 out of the way of the links 531 so that these links may move forwardly to positions somewhat beyond the "9" position if necessary. In order to accomplish this movement of the 9 stop to an ineffective or disabled position, and also to provide for moving the stepped plates 503 out of the way, the total and sub-total key 575 (corresponding to 167 of the White patent) has secured to it a cam 577 (Figs. 3, 7, and 9) which operates upon a pin 579 on an arm 581 fixed to a shaft 583 extending across the machine. This shaft also has fixed to it another arm 585 (Figs. 3, 4, and 8) having a forked end engaging a pin 587 on an extension arm 589 of a bail 591 mounted to swing on the cross shaft 593. The bail is pivotally connected to the rear end of a link 595, the forward end of which is pivoted to one arm of a bell crank lever 597 which is pivotally mounted on the frame at 599. The other end of the bell crank lever has a pin 601 engaging a slot in a lever 603 fixed to a stub shaft 605 mounted on an upwardly extending plate 606 (Figs. 8 and 10) fixed to the left hand upward extension 487 of the frame 481. The pivot screw 509 of the left hand bell crank 511, and the undermentioned pivot screw 621 may be utilized for securing the plate 606 to the extension 487. Another arm 607 fixed to the stub shaft 605 has a pin 609 engaging a slot 611 formed in one of the ears on which the stop plate 567 is pivoted.

The total key 575 has a central neutral or adding position, illustrated in Figs. 1, 2, 7, and 8. The cam 577 is so shaped that when the total key is moved either rearwardly to the total taking position shown in full lines in Fig. 9, or forwardly to the sub-total taking position indicated by the right hand set of dotted lines in Fig. 9, the shaft 583 will in either case be swung clockwise (when viewed as in Fig. 9) from the position which the shaft has when the total key is in its intermediate or neutral position. This clockwise swinging of the shaft 583 will cause counterclockwise swinging of the bail 591, pushing downwardly and forwardly on the link 595 to swing the bell crank lever 597 clockwise when viewed as in Figs. 8 and 9, depressing the pin 601, raising the pin 609, and thus raising the "9" stops 565 of all denominations from the normal or operative position shown in Figs. 4 to 8, inclusive, to the ineffective or disabled position shown in Figs. 9 and 10.

At the same time, the counterclockwise turning (when viewed as in Figs. 8 and 9) of the shaft 605 will cause downward movement of an arm 615 (Figs. 8 and 9) fixed to this shaft, and downward movement of a link 617 pivoted to the arm, which link is also pivoted to a blocking member 619 mounted for oscillation on a pivot 621. When the blocking member 619 is in its lowermost position, it lies immediately behind a stud 333 on the rear end of a link 178 which forms part of the check writer unit, which stud and link correspond respectively to the stud 333 and the link 178 disclosed in said patent.

Figure 9:
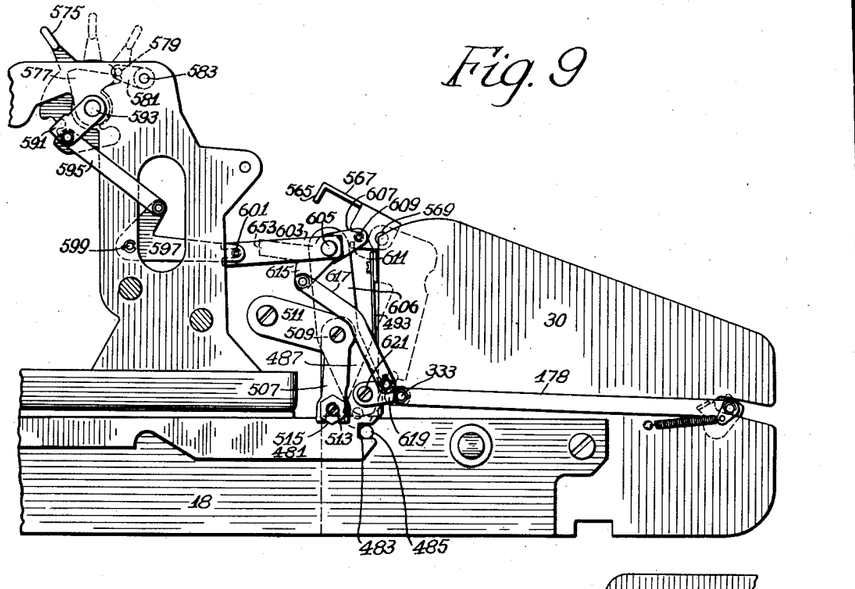
Fig. 9 is a view similar to a fragment of Fig. 8, showing certain parts in a different position.
Figure 10:
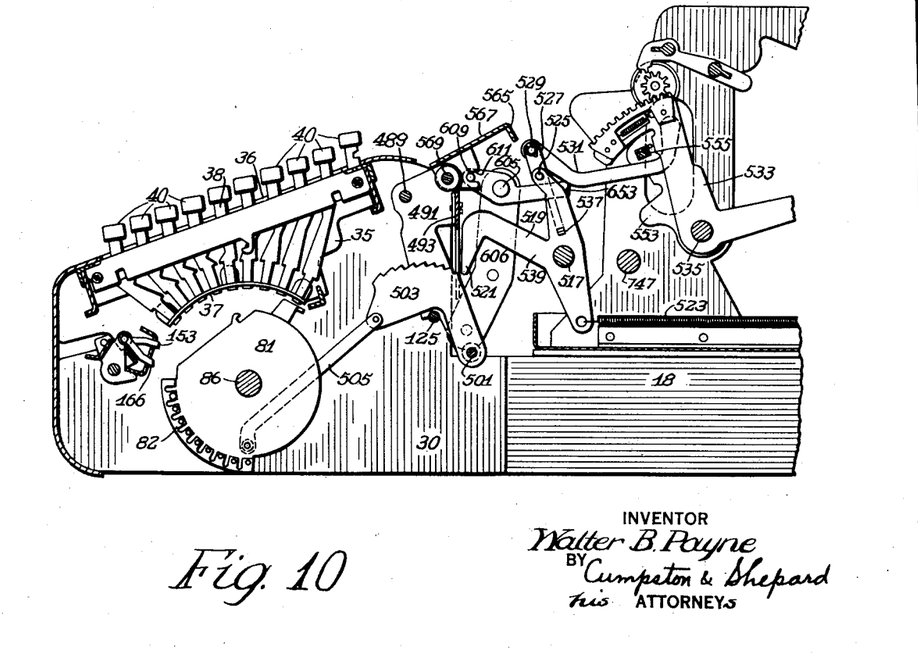
Fig. 10 is a vertical sectional view similar to Fig. 5, and likewise taken substantially on the line 5—5 of Fig. 3, and illustrating the parts in a position which they assume during the taking of a total or sub-total.

As described in said patent, this link must move rearwardly at each operation of the machine in order to allow the blank stops 166 and zero stops 153 to be projected into effective position. When the blocking member 619 is in the position shown in Fig. 8 (the total key being in its neutral or intermediate position), it does not interfere with rearward movement of the link 178, and the zero stops and blank stops are operated as usual. But when the blocking member 619 is moved to its lower position, as shown in Fig. 9, by movement of the total key 575 to either total or sub-total position, then the blocking member lies in the path of the stud 333 and prevents rearward movement of the stud, thus preventing the link 178 from moving rearwardly and preventing the zero stops 153 and blank stops 166 from being projected to an effective position. If no keys 40 of the keyboard have been depressed, and the operating cycle of the machine is now performed, neither the zero stops 153 nor blank stops 166 nor the key stops 38 will be projected into the paths of the controller arms 110. Hence, upon operation of the bail 113, the controller arms will not be stopped until they reach the extreme limit of motion, somewhat beyond the key stem 38 of the "9" key, as shown in Fig. 10. Thus all of the type disks 81 will be moved around to a position at least as far as or preferably somewhat beyond the "9" position, and all of the stepped plates 503 will be moved to or beyond the "9" position as shown in Fig. 10, carrying all of the steps on these plates out of the paths of travel of the noses 521 on the feeler arms 519, the "9" stop 565 being at this time in an ineffective position. Hence the links 531 may move forwardly as far as may be necessary, without contacting with the "9" stop 565, in order to take a total or a sub-total in the well understood manner referred to in said Peters and White patents.

When a total or sub-total is being taken, no key 40 of the keyboard should be depressed. Consequently, locking mechanism is provided (Figs. 11–13) to prevent the shifting of the total key 575 to a total or sub-total position when any key 40 in any denomination of the keyboard is depressed, and to lock all of the keys 40 against depression whenever the total key 575 has been set for taking a total or sub-total. This interlocking mechanism comprises a lug 625 mounted on and extending downwardly from each control bar 60 of each bank or denomination of keys 40, these lugs lying just in front of a bail-like plate 627 one end of which is secured to an arm 631 pivoted on the shaft 335 and the other end of which has an ear likewise pivoted on the shaft 305, which shaft may correspond to the shaft 305 in said patent. A spring 629 normally tends to move the upper edge of the plate 627 forwardly against the lugs 625. Depression of any key 40 in any bank of keys will move the control bar 60 of that bank of keys rearwardly, thus moving the lug 625 rearwardly and causing rearward movement of the upper edge of the plate 627, so that the arm 631 fixed to the plate is moved downwardly to carry a stop pin 633 to a point below the upper arcuate edge 635 of a sector plate 637 rotatably mounted on the shaft 125, which may correspond to the shaft of the same number in said patent. This sector plate 637 is under the influence of a spring 639 normally tending to move it in a clockwise direction until a tail 641 fixed to the plate contacts with the shaft 305. The plate also has an arm 643 lying in front of a stud 645 on an arm 647 fixed to the shaft 605.

When the total key 575 is in its normal or neutral position, the shaft 605 is in the position shown in Figs. 8 and 11, and the spring 639 holds the sector plate 637 in the position shown in Fig. 11, with the forward end of the arcuate surface 635 somewhat to the rear of the pin 633, so that it does not interfere with downward movement of the pin 633 when any key 40 is depressed. Thus the keys 40 may be used to set up any desired numbers. When any key 40 is depressed, however, the pin 633 is thereby shifted downwardly to the position shown in Fig. 13, where it lies in front of the upper end of the sector plate 637 and prevents forward movement of the arm 643 and of the stud 645, which prevents rotation of the shaft 605 in a clockwise direction from the position indicated in Fig. 13, which in turn prevents shifting the total key 575 from its neutral or intermediate position. Thus a total or sub-total may not be taken when any key 40 of the keyboard is depressed. At a time no key 40 is depressed, if the total key 575 be shifted either forwardly or rearwardly to take either a sub-total or a total, then this will move the shaft 605 in a counterclockwise direction when viewed as in Figs. 11 and 13, shifting the parts from the full line position shown in Fig. 11 to the dotted line position shown therein. Thus the arcuate surface 635 will be brought beneath the pin 633 to prevent depression thereof. Since no key 40 can be depressed without causing downward movement of the pin 633, this effectively locks all of the keys of the keyboard against depression until the total key 575 is once more moved back to its intermediate or neutral position.

Sometimes it may be desirable to provide an adding and listing unit having a greater denominational capacity or number of denominations than the check writing unit to which it is attached. For example, it may be desirable to supply check writing units with different numbers of denominations at different prices, say seven denomination machines at one price and nine denomination machines at another price. It may, however, be more economical to build all of the adding and listing units identical with each other and so arranged that they may be applied to any of the check writing machine units irrespective of the number of denominations in the check writing machine. If the adding and listing unit has any denominations higher than the highest denomination of the check writing unit, some zero stop means must be provided for these higher denominations of the adding and listing unit, to prevent the links 531 and the rack levers 533 of these higher denominations from moving forwardly during the operating cycle, which forward movement would result in erroneously running a number into the totalizer and printing it on the listing strip. Yet such zero stops should be disabled when a total or sub-total is taken, in order to permit the links 531 to move forwardly at that time. To this end, each of those denominations of the adding and listing unit which are higher than the highest denomination of the accompanying check writing unit, may be provided, in place of the short pivot studs 525, with longer studs 651 (Fig. 3) in the same locations as the pivot pins 525 of the lower denominations, but substantially longer. These long studs 651 lie in the same vertical planes, passing from front to back of the machine, with zero stop arms 653 fixed on the shaft 605. When the total key 575 is in its normal intermediate position, the stop arms 653 lie in the positions shown in Figs. 4 and 5, and in full lines in Fig. 11. Then when the machine is operated, the long studs 651 of the higher denominations will come into contact with the rear ends of the stop arms 653, so that further forward movement of the links 531 in these higher denominations will be prevented and no improper amount will be run into the totalizer or will be listed, although these higher denominations will still be available for carrying or transferring of digits from lower denominations. When the total key is moved to either total or sub-total position, the swinging of the shaft 605 in a clockwise direction when viewed as in Fig. 11 will carry the stop arms 653 downwardly from the full line position of Fig. 11 to the dotted line position thereof, in which these stop arms are below the studs 651 and do not interfere with forward movement of these studs or of the links 531 of these higher denominations, so that totals and sub-totals can be taken in the usual way.

In the machine here disclosed as an illustrative embodiment of the invention, the check writing unit has nine denominations and the adding and listing unit is provided with ten denominations, as seen in Fig. 3, and only the highest denomination of the adding and listing unit is provided with the above mentioned long stud 651. Three stop arms 653 are shown on the shaft 605 ready for cooperation with such studs 651 as may be provided. Three such studs would be provided if the accompanying check writer unit had only seven denominations, and then all three of the arms 653 would come into play, but with a check writer unit of nine denominations, as here shown, two of the arms 653 perform no function and could be omitted if desired. To promote manufacturing standardization or uniformity, it may be desirable, however, to provide on all machines a standard number (such as three) of the arms 653, and to accommodate the adding and listing units to different check writing units by varying the number of studs 651 employed, without varying the number of arms 653. Of course the number of arms 653 could be varied as occasion demands, with or without varying the number of studs 651, if preferred.

The driving or operating mechanism for the present machine may be moved by manual power, if desired, although preferably the machine is driven by an electric motor controlled from a manual trip bar 661 (Figs. 1 and 7) conveniently accessible near the right hand edge of the check writing unit. The electric motor, not shown, is mounted within the casing 15 and continuously operates a drive shaft 663 (Fig. 4), rotating it in a counterclockwise direction. This drive shaft operates other shafts through various clutches, which shafts and clutches may be constructed substantially in the same manner disclosed in the United States patent of Walter B. Payne, No. 2,122,536, granted July 5, 1938. The above mentioned drive shaft 663 of the present mechanism may correspond to the drive shaft 239 of said Patent 2,122,536, and may, when the trip bar 661 is actuated, drive another shaft 665 (corresponding to the shaft 220 of said patent) and may also drive another shaft 667 (corresponding to the shaft 63 of said patent) which carries a plurality of cams here collectively indicated by the numeral 669 (corresponding to 60, 61, and 62 of the patent) for operating respectively upon a plurality of follower rollers 671 mounted on bell cranks 673 pivoted on a cross shaft 675 on a bracket 677. Members 679 on these bell cranks (corresponding to members 58 in said patent) lift the rear ends of a plurality of platen carriers 681 (corresponding to carriers 52 in said patent) when the shaft 667 is rotated, to press platen bars 683 upwardly through slots in the casing plate 16 and against the lower side of a sheet interposed between the platens 683 and the printing types 82, in order to print on such sheet whatever numerals or other designations appear on those printing types which are set at the printing line, that is, in line with the platens 683.

In order to disable the platen operating mechanism when desired, so that a total or sub-total may be taken, for example, without printing on a sheet placed in the check writer, the bracket 677 which supports the shaft 675 may be mounted upon an eccentric portion of the shaft 685. By means of a finger piece 686 (Fig. 2) the shaft 685 may be turned to lower the bracket 677, thus lowering the shaft 675 so that even when the cams 669 rotate, the platens 683 do not move upwardly far enough to effect a printing operation.

The clutches and driving parts disclosed in said Patent 2,122,536 are therein illustrated as driving a check writing unit of substantially the same kind herein disclosed, so that it will be readily apparent that the same construction described in said patent may be used in exactly the same way for driving the check writing unit of the present application. It is, therefore, believed unnecessary to describe the clutches and driving mechanism in greater detail herein, and it is believed sufficient to state that when the trip 661 is operated, the constantly rotating shaft 663 first drives the shaft 665 through approximately half a revolution, to position the type disks 81 and printing types 82 in accordance with the numbers set up on the keyboard. In the present instance, this also positions the stepped plates 503 in accordance with the number set up on the keyboard. Then rotation of the shaft 665 is temporarily suspended, and the shaft 667 begins to rotate, to cause upward movement of the platen sections 683 to print on the check or other sheet positioned in the check writing unit, while the shaft 665 remains stationary. Upon the completion of this printing operation (approximately the completion of one full revolution of the shaft 667) the shaft 667 stops and the rotation of the shaft 665 again commences and continues for approximately another half revolution, which restores the type disks 81 to their initial or unset position.

The operation of the check writing unit from the shaft 665 may be accomplished through a stub shaft 691 (Fig. 7) alined with the shaft 667 but not directly connected thereto, the stub shaft 691 being driven by gearing from the shaft 665 and corresponding to the shaft 243 of said Patent 2,122,536. The stub shaft 691 carries a crank arm 693 operating a link 695 (parts 244 and 246 of patent) the upper end of which is pivoted at 697 to an arm 699 rotatably mounted on a shaft 701 corresponding to the shaft 250 of said patent 2,122,536. An arm 703 pivoted to the arm 699 carries a roller 705 normally held by a spring 707 in a notch in the end of an arm 709 fixed to the shaft 701, so that the movements of the arms 699, caused by the crank 693, normally drive the shaft 701, but the roller 705 may slip out of the notch in the arm 709 to disable the driving connection if there is excessive resistance to operation of the check writing unit, these parts forming a breakable or resilient connection preventing damage to the check writing unit under certain conditions. The above mentioned shaft 701 is alined with the main drive shaft 250 of the check writing unit and is connected thereto by uniting parts indicated in general by the numeral 711, corresponding to the connecting parts 251 to 254, inclusive, of said Patent 2,122,536.

The adding and listing unit of the machine should not be actuated until the type disks 81 of the check writing unit have been completely set in their intended positions, so that the stepped plates 503 are set in position to control the adding and listing mechanism. Since the platen sections 683 are also not operated until the type disks 81 have been set, it is apparent that the adding and listing unit may be actuated at the same time that the platen parts 683 are actuated, and thus the adding and listing mechanism may be driven from the same shaft 667 which operated the printing platen of the check writing unit. To this end, the shaft 667 is preferably extended leftwardly to the left side of the machine and is there provided with a crank arm 715 (Fig. 8) connected to an upwardly extending link 717, the upper end of which is pivoted to an arm 719 rotatable on a shaft 721 which extends rightwardly some distance from the left side of the machine, at an elevation above the horizontal plane of the check or other paper printed upon, and within the casing section 19. This arm 719 drives the shaft 721 by the same kind of breakable or resilient connection above described with respect to the arm 709 and shaft 701, namely, an arm 723 carrying a roller 725 engaging a notch in the end of the arm 727 fixed to the shaft 721, the roller being held in the notch by a spring 729.

The shaft 721 has fixed to it another arm 731 carrying a pin 733 which enters a notch in the lower side of the forward end of a link 735, the rear end of which is pivoted at 737 to an actuating segment 739. A lever 741 is pivoted at 743 near its midpoint to the arm 735, and the front end of the lever 741 underlies the pin 733 to hold it in the notch in the arm 735. The rear end of the arm 741 is normally held in fixed position relatively to the arm 731 by a removable pin 745. When this pin is removed, the rear end of the arm 741 may be swung upwardly, moving the front end thereof downwardly to release the pin 733 from the notch in the arm 735, so that the drive of the adding and listing unit may be disconnected.

When the shaft 667 rotates to shift the platen sections 683 (the shaft 665 then being stationary) the rotation of the shaft 667 also moves the link 717 first upwardly from the position shown in Fig. 8 and then downwardly again to that position. This swings the arm 731 first in a counterclockwise direction when viewed as in Fig. 8, and then clockwise back to its initial position. Thus the link 735 is moved first rearwardly and then forwardly, causing corresponding clockwise and then counterclockwise rotation of the segment 739, which is mounted on and correspondingly moves the shaft 747, which is the main control shaft of the adding and listing unit and which corresponds to the main shaft 22 of said White patent.

The segment 739 is preferably mounted on the shaft 747 so that it may be turned relatively to the shaft through a limited range, to permit easy adjustment of the driving connections to compensate for manufacturing inaccuracies and to insure proper normal position of the shaft 747 when the driving connections are in initial rest position. This is preferably accomplished by making the segment 739 rotatable upon the shaft 747 or upon a stud or screw at the end of the shaft, and by providing alongside the segment 739 a plate 748 (Fig. 8) fixed nonrotatably to the shaft. Bolts 750 pass through holes in the segment 739 and through elongated arcuate slots in the plate 748. When the bolts are tightened, the segment is fixed to the plate and therefore fixed to the shaft, but when the bolts are loosened, the segment may be turned relatively to the shaft to an extent permitted by the lengths of the slots in the plate 748.

The various parts of the adding and listing mechanism are operated directly or indirectely from the main shaft 747, in a manner well known in the art, and it is unnecessary to give further operating details here. It may be said, however, that near the right side of the machine the main shaft 747 is provided with a crank disk 749 (Fig. 7) connected by a link 751 to an arm 753 on the shaft 559 so that the shaft 559 (corresponding to shaft 24 of the White patent) is moved from the shaft 747.

The machine may be provided with suitable adjustable paper guides on the top 16 of the base, such guides being indicated in general by the numerals 761 in Fig. 1. There may also be feeding means for feeding a single check or a sheet containing a series of checks through the machine, preferably from front to back, or in any other desired direction. This feeding means may include suitably driven rollers 763 (Figs. 2, 7, and 8) the bite or pressure of which may be controlled by a finger piece 765 to release the feeding rollers when desired. The paper guides and the feeding rollers and the drive mechanism for the rollers may all be constructed in substantially the manner disclosed in the copending application of Walter B. Payne for United States Letters Patent on Paper feeding mechanism, Serial No. 123,161, filed January 30, 1937, now Patent 2,144,930, granted January 24, 1939. As disclosed in said copending application, the paper guides and the feeding mechanism are adapted for use with various widths of checks, and with either single checks or sheets of checks, so that the machine has great flexibility.

The machine may also comprise an electric socket 771 (Fig. 2) for connection through a suitable cord to any source of electric current to supply energy to the motor mounted in the base 15 of the machine. A manual switch 773 may be provided to turn the motor on or off as required, it being understood that the motor is turned on and runs continuously while the machine is in use, and that the trip bar 661 preferably does not turn on the motor but merely operates the clutch mechanism.

The adding and listing unit of the machine may be provided with means for holding a roll 775 of paper to extend around the platen 551 and to receive the printing impression made by the listing types 547. The machine may also have the usual finger piece 777 to determine the spacing at which successive items are printed on the paper from the roll 775, or to disable this printing entirely if desired. It may also have the usual finger piece 779 shiftable to a non-add position to disable the adding mechanism when desired in a manner well understood in the art. If, for example, a check is spoiled in making it out, a new check for the same amount can be written on the check writing unit of the machine, with the finger piece 779 moved to non-add position, so that the amount of the duplicate check is not run in the totalizer or listed on the listing record, because it is a duplication of the same amount previously run into the totalizer and listed when originally making out the spoiled check.

The adding and listing unit of the machine, together with part of the mechanism for controlling this unit from the check writing unit, preferably is so mounted that it may be bodily and easily removed from the check writing unit when desired. For example, the adding and listing unit itself may all be mounted on or supported from the frame 481, which in turn may rest upon the frame plates 18 which are supported by the U-shaped brackets 17 from the base 15. Removal of the adding and listing unit is normally prevented by the interengagement of the pins 485 with the notches 483, and by the releasable latches 781 (Figs. 2, 7, and 8) which are pivoted on stud screws 783 on the frame plates 18, and which are normally held by springs 785 in latching engagement with studs 787 on the frame members 481. The stud screws 783 pass through recesses 789 (Fig. 4) in the lower edges of the frame members 481, so that the adding and listing unit can not be moved rearwardly to free the notches 483 from the pins 485 until the rear end of the unit is first lifted to free the notches 789 from the studs 783, which lifting can not take place until the latches 781 are unlatched from the pins 787. Thus the latches 781 effectively hold the adding and listing unit in place, but when these latches are released the entire adding and listing unit may be lifted off of the base plate 18, the line of separation being between the parts 517, 521, 609, 619, and 645, mounted on the adding and listing unit, on the one hand, and the parts 503, 565, 567, 333, and 643, mounted on the check writing unit, on the other hand. It is noted that although the parts 521 of the adding and listing unit cooperate with the parts 503 of the check writing unit and are controlled thereby, and although the parts 531 of the adding and listing unit cooperate with the parts 565 of the check writing unit, yet there is no actual linkage connection between these parts which interferes with separation thereof, when the adding and listing unit is lifted away from the check writing unit. The pin and slot driving connection 735 is released before the adding and listing unit is removed, by taking out the removable screw 745 and releasing the pin 733 from its notch in the link 735. The adding and listing unit may be quickly and easily replaced upon the check writing unit by a reverse operation.

The operation of the various parts of the machine has been described above or in the various copending applications and issued patents referred to sufficiently so that those skilled in the art will readily understand the operation. It may be desirable, however, to give here a brief outline of the principal features of a typical operation of the machine.

Assuming that the motor is turned on and running, suppose it is desired to write a check for $3059. The check will be placed on the top 16 of the base 15 and moved to the proper position at the printing line of the check writer, either manually or by the feeding rollers 763. The operator then depresses the proper keys 40 of the check writer keyboard to set up the numerals 3059, no key being depressed in any denomination above the thousands of dollars denomination, or in the hundreds of dollars denomination, but the 3 key being depressed in the thousands of dollars denomination, the 5 key in the tens of dollars denomination and the 9 key in the units of dollars denomination. (The units and tens of cents denominations will not be considered in the following discussion, though they would operate in the same way as the various dollar denominations, if any cents keys were depressed.) The operator then depresses the trip bar 661. This trips the clutch mechanism in such a way (see Patent 2,122,536) that the shaft 665 first makes half a revolution and then stops, then the shaft 667 makes one complete revolution and stops, and then the shaft 665 makes another half revolution and then stops, completing the cycle of operation.

During the first half revolution of the shaft 665, the stub shaft 691 is turned through half a revolution to move the arm 699 upwardly and thus swing the main control shaft 250 of the check writing unit in a counterclockwise direction when viewed as in Fig. 4. This causes clockwise swinging of the bail 113, swinging all of the driving members 85 of all denominations around the shaft 86 in a clockwise direction. Each control member 110 of each denomination swings around with its associated driving member 85 until the control member strikes one of the key stops, blank stops, or zero stops. In all denominations higher than the thousands of dollars denomination, the blank stops 166 will be projected, and the control arms 110 in those higher denominations will move only a short distance until they strike the blank stops, and the type disks 81 of those denominations will not be moved to printing position. The stepped plates 503 of all these higher denominations will be set with the "blank" steps thereof in position to cooperate with their respective feeler beaks 521. These "blank" steps are in the nature of concentric elongations of the "zero" steps, and the result on feeler beak 521 is the same whether its associated stepped plate 503 be set in "blank" position or in "zero" position.

In the thousands of dollars denomination, the arm 110 will swing around until it hits the depressed end of the stem 38 of the "3" key. This will set the type disk 81 of this denomination in position with the "3" type 82 alined with the printing platen 683, and the stepped plate 503 of this denomination will be correspondingly set with the "3" step of this plate in position to be contacted by the beak 521. In the hundreds of dollars denomination, the blank stop 166 will not be projected due to the fact that a significant digit has been set up in a higher denomination (namely, the thousands of dollars denomination) but the zero stop 153 of this hundreds of dollars denomination will be set or projected, because no key 40 was depressed in this denomination. Hence, in the hundreds of dollars denomination, the arm 110 will swing around until it contacts with the zero stop 153, and this will cause movement of the type disk 81 through approximately one step, bringing the "0" type on the type segment 82 into line with the printing platen 683. The stepped plate 503 of this denomination will be moved by the link 505 to a corresponding position in which the zero step on the stepped plate is ready for cooperation with the nose 521 of the feeler arm 519 of that denomination.

In the tens of dollars denomination, where the "5" key 40 has been depressed, both the blank stop 166 and the zero stop 153 will be withdrawn, but the key stem 38 of the "5" key will be projected, and the control member 110 will swing around the shaft 86 until it contacts with the projecting stem of the "5" key, thus setting the type disk 81 and the printing types 82 with the numeral "5" at the printing line of the check writer, and setting the stepped plate 503 of this denomination in position with the "5" step thereof ready to cooperate with the nose 521 of the feeler 519 of this denomination.

In the units of dollars denomination, the zero stop and the blank stop will likewise remain withdrawn and the controller 110 will swing around until it contacts with the stem 38 of the "9" key. This will place the printing type 82 in position to print "9" at the printing line of the check writer and will move the stepped plate 503 of the units of dollars denomination one step beyond the last or "8" step thereof, so that no step on this plate 503 is in position to cooperate with the nose 521.

The type disks and stepped plates of the tens of cents and units of cents denomination will likewise be positioned in accordance with whatever keys 40 have been set in these denominations, but for purposes of the present explanation these cents denominations are neglected.

The position of the parts of the hundreds of dollars, tens of dollars, and units of dollars denominations will now be as illustrated in Fig. 5, which shows the parts for these three denominations only, and in which the stepped plate 503 and the type disk 81 farthest from the eye of the observer are set to zero position, and the intermediate step plate and type disk are set to "5" position, while the stepped plate and type disk closest to the eye of the observer are set to "9" position.

This setting operation takes place, as above stated, during the first half revolution of the shaft 665. When this shaft comes to rest and the rotation of the shaft 667 begins, such rotation, through the cams 669, lifts the platen carriers 681 and forces the platen sections 683 upwardly to cause a printing impression to be made by the ribbon 470 upon the check or other sheet interposed between the ribbon and the platen sections 683, which printing impression will, of course, print whatever is indicated on those type members which have been alined with the platen sections 683. At the same time, the rotation of the shaft 667 will cause upward and then downward movement of the link 717, moving the link 735 first rearwardly and then forwardly and swinging the shaft 747 first in a clockwise direction when viewed as in Fig. 8 (or counterclockwise direction viewed as in Fig. 7) to operate the adding and listing unit of the mechanism. During approximately the first half of this movement of the shaft 747 (that is, that part thereof which is counterclockwise when viewed as in Fig. 7) the totalizing wheels 543 will be out of engagement with the racks on the rack levers 533, and the rack levers will be moved forwardly under the influence of the springs 523 until either the noses 521 come into contact with the stepped plates, or the forward ends of the links 531 come into contact with the "9" stops 565, or the pin 651 comes into contact with the arms 653, whichever first occurs.

In the case of the three denominations illustrated in Figs. 5 and 6, the denominational parts farthest from the eye of the observer in these figures (namely, the hundreds of dollars denomination) will move forward only a small amount until the nose 521 of this denomination comes into contact with the "zero" step of the stepped plate 503 of this denomination. In the next lower denomination, or tens of dollars denomination, the rack lever 533 will move forwardly until its connected nose 521 comes into contact with the "5" step of the corresponding stepped plate 503, as shown in Fig. 6. In the denomination nearest the eye of the observer, or units of dollar denomination, the rack lever 533 will move still farther forwardly, through 9 steps or spaces, the extent of movement this time being determined not by the stepped plate 503 but by the "9" stop 565 contacting with the front end of the link 531, since there is no "9" step on the plate 503. The forward movements of the rack levers 533 will simultaneously raise the type carriers 545 to corresponding extents, to set the corresponding listing type elements 547 in proper position to print the desired numbers on the listing strip on the platen 551.

In those denominations higher than that of the highest significant digit set on the keyboard keys 40, the beaks 521 will move into contact with the "blank" steps of the plates 503, or in those high denominations, if any, which have no plates 503, the pins 651 will move into contact with the rear ends of the arms 653. In either case, the movement of the feelers 519 will be very small, and no listing types 547 in these denominations will be set to effective position, nor will the totalizer wheels 543 of these denominations be actuated to run numbers thereinto, except possibly by transfer from lower denominations.

At the end of the counterclockwise revolution of the shaft 747, which corresponds approximately to the completion of half of a complete revolution of the shaft 667, the parts will be approximately in the position shown in Fig. 6. Then the shaft 747 turns in the opposite direction, or in a clockwise direction when viewed as in Fig. 7, and this causes the cross bar 555 to swing rearwardly and carry back with it all of the rack levers 533, the totalizer wheels 543 meanwhile being in mesh with the racks so that the rearward movement of the rack levers runs into the totalizers the numbers corresponding to the positions to which the rack levers have been set. Before such rearward movement commences and while the rack levers are still set in their forward positions, the printing hammers 549 are tripped to actuate the printing types 547 alined with these hammers, thus producing the desired impression through an inked ribbon or otherwise on the paper record strip on the platen 551.

Upon the completion of the full revolution of the shaft 667, the parts of the adding and listing mechanism have been restored to their initial or idle position, but the type disks and other parts of the check writing unit still remain in their set positions with the numbers set up thereon. Then the shaft 665 begins the second half of its revolution which moves the main shaft 250 of the check writing unit in a clockwise direction when viewed as in Fig. 4 and swings the bail 113 in a counterclockwise direction, swinging all of the type disks 81 back to their unset or normal positions. The keys 40 are released so that the depressed keys spring up to unset position, and all of the parts are restored to initial or normal position ready for the next operation. The rotation of the shaft 665 then stops at the end of this second half revolution (see Patent 2,122,536) and the machine is ready for another cycle of operation.

If a total or sub-total is to be taken, instead of running a number into the totalizer, the operation is the same as before except that the total key 575 is moved either backwardly to total-taking position or forwardly to sub-total-taking position. This, through the mechanism illustrated in Figs. 11 and 12, locks all the keys 40 of the check writer keyboard against actuation so that no key can be depressed, and through the parts 617 and 619 (Fig. 9) it also holds the bar 178 against rearward movement so that all of the zero stops 153 and blank stops 166 are held in retracted or ineffective position. Also it turns the member 567 to lift the "9" stops to an ineffective position out of the paths of the members 527 and links 531. Then when the bail 113 swings around in the same manner as above described, there are no zero stops, blank stops, or key stops to contact with the arms 110 of any denomination, so that all of these control arms swing all the way around to a position at or slightly beyond the "9" position, as shown in Fig. 10. This brings the stepped plates 503 of all denominations to or a little beyond the "9" position, with no steps on these plates in the paths of the noses 521 of the feeler levers.

Then, during rotation of the shaft 667, the rack levers 533 move forwardly as before, but this time the totalizer wheels remain in mesh with the racks instead of being out of mesh therewith. The racks move forwardly only until the totalizer wheels are brought to zero, in known manner, thus positioning the type carriers 545 and listing types 547 in accordance with the numbers that were set up on the totalizer wheels immediately prior to the taking of this total or sub-total. The "9" stops 565 as well as the stepped plates 503 being out of the way of the parts at this time, the links 531 and rack levers 533 may move forwardly as far as necessary, without being impeded by the "9" stops or stepped plates. After the hammers 549 are actuated to print the total or sub-total on the listing strip, the rack levers move rearwardly again to initial position. If a total is taken, the totalizer wheels 543 are unmeshed from the rack levers before these levers move rearwardly, thus leaving the totalizer wheels set at zero. If a sub-total is taken, the totalizer wheels remain meshed with the rack levers during the rearward movement thereof as well as during forward movement, in order to set up again on the totalizer wheels the amount present thereon immediately prior to taking the subtotal. The check writer unit platen carrier 681 is actuated during the taking of a total or sub-total in the same manner as before, but if it is desired not to perform a printing operation on the check writer unit, the finger piece 686 may be shifted prior to taking the total or sub-total, to lower the bracket 677 and prevent the platen sections 683 from raising high enough to produce a printing operation, and this may also be done whenever it is desired to use the apparatus as an adding and listing machine, without writing checks.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. The combination of a differentially settable control member, a feeler member mounted for oscillation into and out of cooperative relation to said control member, a lever pivotally mounted on said feeler member for oscillation thereon about a pivot, an actuating member, and means operatively connecting said actuating member to said lever at a point thereon spaced from said pivot, said feeler member having a recess therein at a point spaced from said pivot, said lever having an ear extending into said recess to restrain said lever against turning about said pivot relatively to said feeler member, the portion of said lever between said ear and said pivot being relatively easily bendable so that, by bending it, the position of said actuating member may be adjusted relatively to said feeler member.

2. A machine including a movable stepped member having a series of steps including steps representing digits from "1" to "8" inclusive, positioning means including a feeler portion movable toward said steps to cooperate therewith, means for setting said stepped member to different positions to bring different steps thereof into the path of said feeler portion, a movable stop member having a normal position lying in the path of said positioning means to limit movement of said positioning means to an extent corresponding to the digit "9" whenever no step representing a lower digit is in the path of said feeler portion, and manually operable means for moving said stop member from said normal position to an ineffective position in which said positioning means may move to an extent greater than that corresponding to the digit "9."

3. An accumulating and total-taking machine including a movable stepped member having a series of steps including steps representing digits from "1" to "8" inclusive, a positioning member including a feeler portion movable toward said steps to cooperate therewith, means for setting said stepped member to different positions to bring different steps thereof into the path of said feeler portion, a movable stop member having a normal position lying in the path of said positioning member to limit movement of said positioning member to an extent corresponding to the digit "9" during normal accumulating operations whenever no step representing a lower digit is in the path of said feeler portion, a manually operable total key for conditioning the machine for a summation operation, and means connecting said total key to said movable stop member to move said stop member from said normal position to an ineffective position out of the path of said positioning member, when said total key is moved to summation conditioning position.

4. A machine including a plurality of movable control members each having a series of abutment portions representing different values, a plurality of movable actuating mechanisms each including movable feeler means for cooperation with said abutment portions of one of said control members, means for selectively setting each of said control members in position with any selected one or none of its abutment portions in the path of movement of an associated feeler means, a movable stop member cooperating with said actuating mechanisms to limit movement of each of said mechanisms with respect to which no one of said abutment portions is in effective position, said stop member being movable as a unit and having a separate finger portion for cooperation with each separate actuating mechanism, and manually operable means for shifting said stop member as a unit to an ineffective position with respect to all of said actuating mechanisms.

5. An adding and total-taking machine including two actuators movable through variable distances, a control member associated with one of said actuators and selectively settable to a position ineffective to limit the travel of its associated actuator or to various positions effective to limit such travel to variable distances, the other of said actuators being not associated with any control member, a shiftable stop member determining the maximum distance through which said actuator associated with said control member may move during any adding operation, a shiftable holding member for holding against movement that one of said actuators which is not associated with a control member, and a total key effective upon movement to total-taking position to shift both said stop member and said holding member to ineffective positions to permit both of said actuators to move without impedance by said stop member and said holding member during a total-taking operation.

WALTER B. PAYNE.